US009127699B2

(12) United States Patent
Lambertson, Jr. et al.

(10) Patent No.: US 9,127,699 B2
(45) Date of Patent: Sep. 8, 2015

(54) QUICK FIT ADJUSTMENT MECHANISM FOR EXTENSION POLE SYSTEM FOR PAINT ROLLER

(71) Applicant: The Sherwin-Williams Company, Cleveland, OH (US)

(72) Inventors: Michael C. Lambertson, Jr., Aurora, OH (US); Rita Forman-House, Avon Lake, OH (US); Dennis P. De Renzo, Jr., Concord Township, OH (US); Michael O'Banion, West Minister, MD (US)

(73) Assignee: The Sherwin-Williams Company, Cleveland, OH (US)

( * ) Notice: Subject to any disclaimer, the term of this patent is extended or adjusted under 35 U.S.C. 154(b) by 195 days.

(21) Appl. No.: 13/840,852

(22) Filed: Mar. 15, 2013

(65) Prior Publication Data

US 2014/0298639 A1    Oct. 9, 2014

(51) Int. Cl.
| | |
|---|---|
| *F16B 7/04* | (2006.01) |
| *B25G 3/18* | (2006.01) |
| *B25G 3/30* | (2006.01) |
| *B23P 11/00* | (2006.01) |

(52) U.S. Cl.
CPC .............. *F16B 7/0406* (2013.01); *B23P 11/00* (2013.01); *B25G 3/18* (2013.01); *B25G 3/30* (2013.01); *F16B 7/042* (2013.01); *Y10T 29/49826* (2015.01); *Y10T 29/49948* (2015.01); *Y10T 403/56* (2015.01)

(58) Field of Classification Search
CPC ........ F16B 7/0406; F16B 7/042; B23P 11/00; B25G 3/18; B25G 3/30; Y10T 29/49948; Y10T 29/49826; Y10T 403/56
USPC ........... 403/322.1, 322.2, 322.3, 322; 15/145, 15/143.1
See application file for complete search history.

(56) References Cited

U.S. PATENT DOCUMENTS

| | | | | |
|---|---|---|---|---|
| 3,049,367 | A * | 8/1962 | Lashta | 285/7 |
| 5,471,701 | A * | 12/1995 | Parfenie | 15/167.1 |
| 5,842,810 | A * | 12/1998 | Morad | 403/301 |
| 5,911,258 | A * | 6/1999 | Morad | 15/145 |
| 5,933,966 | A * | 8/1999 | Yates et al. | 30/276 |
| 5,992,423 | A * | 11/1999 | Tevolini | 132/200 |
| 6,502,585 | B1 * | 1/2003 | Mazzei et al. | 132/237 |
| 8,769,764 | B2 * | 7/2014 | Crouch et al. | 15/328 |
| 8,869,807 | B2 * | 10/2014 | Olson | 132/237 |
| 2007/0017072 | A1 * | 1/2007 | Serio et al. | 24/573.11 |

FOREIGN PATENT DOCUMENTS

DE            804680        *    4/1951    ............... B25G 3/04

* cited by examiner

*Primary Examiner* — Jason L Vaughan
(74) *Attorney, Agent, or Firm* — Deron A. Cook; Daniel A. Sherwin; Vivien Y. Tsang

(57) ABSTRACT

A quick fit adjustment mechanism may include a housing having one end that attaches to a pole and another end with threads that engage threads formed in one paint accessory. A lever may be used to cause actuator pins to extend from the housing to secure another paint accessory to the pole.

20 Claims, 10 Drawing Sheets

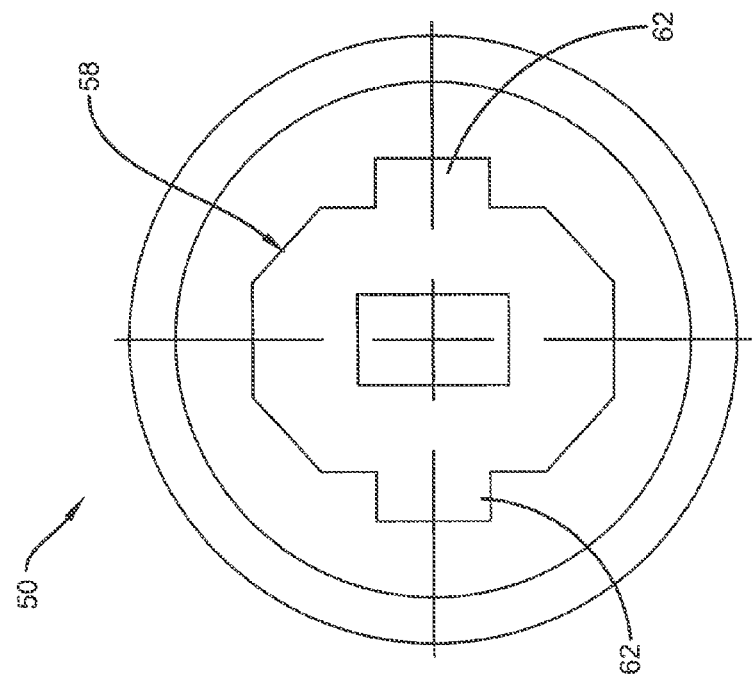
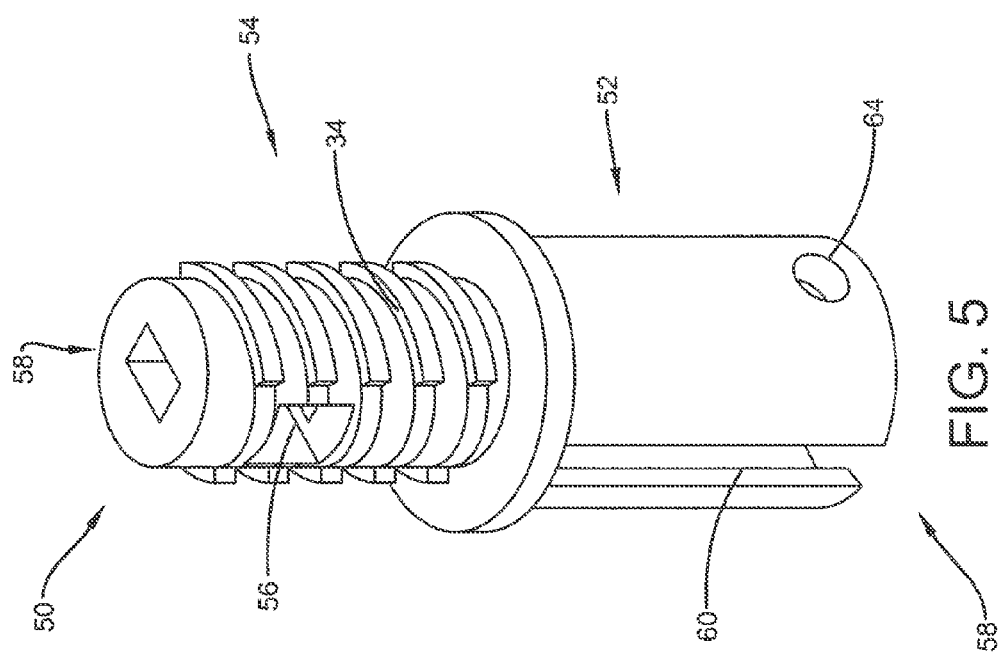

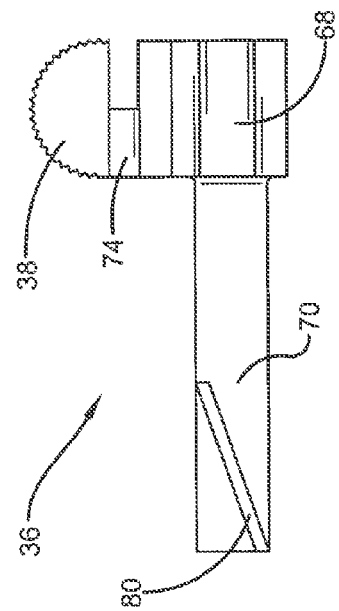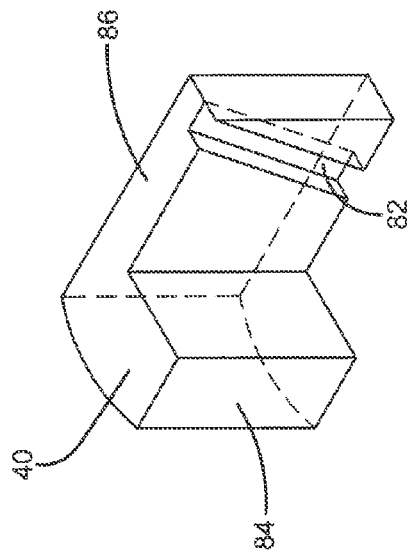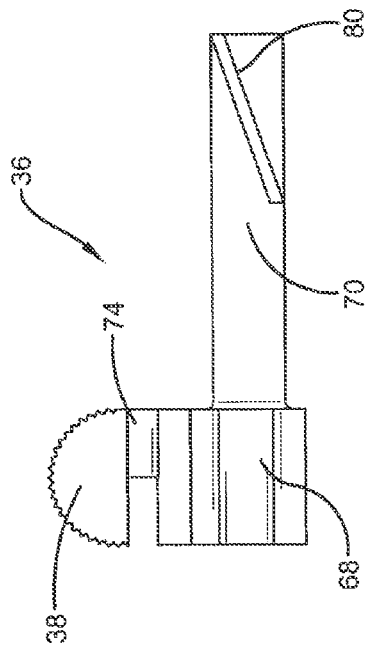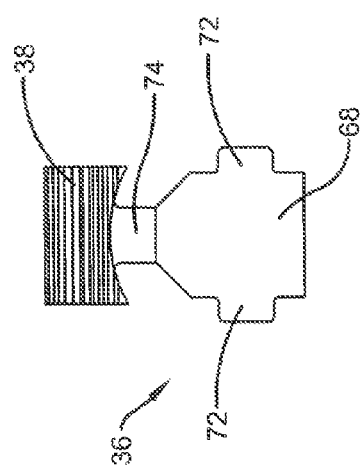

QUICK FIT ADJUSTMENT MECHANISM FOR EXTENSION POLE SYSTEM FOR PAINT ROLLER

I. BACKGROUND

A. Field of the Invention

This invention is in the field of methods and apparatuses for connecting paint related accessories to poles and more specifically to methods and apparatuses for a quick fit adjustment mechanism that easily connects a pole to various types of paint related accessories.

B. Description of Related Art

It is well known in the paint industry to provide poles, which typically are used as a handle by a user, that are designed to connect to and disconnect from specific paint accessories. It is known, for example, to provide a pole that has a threaded distal end that engages threads formed within an opening on a paint roller handle/pole. It is also know, as another example, to provide a pole with an opening, having slots, that receives a paint roller pole/handle having extensions that match the shape and size of the slots.

While many known connect/disconnect mechanisms used in the paint industry work well for their intended purposes, they have a disadvantage. The disadvantage is that a given pole/handle will only connect to a limited number of paint accessories. If a user has a pole and a paint accessory that does not "match" the pole, the user has no option but to purchase a new pole to match the paint accessory or a new paint accessory to match the pole. This adds undesirable cost and undesirable time to painting projects.

What is needed is a quick fit adjustment mechanism that is designed to enable a pole to engage with many different types, sizes, and styles of paint accessories.

II. SUMMARY

According to one embodiment of this invention a quick fit adjustment mechanism may comprise: a housing comprising: (1) a first end that is attachable to an associated pole; and, (2) a second end having (a) an outer surface with threads that are engageable with threads on a first associated accessory to secure the first associated accessory to the associated pole; and, (b) first and second holes; first and second actuator pins that are positioned within the first and second holes, respectively; and, a lever that: (1) is supported to the housing; (2) is moveable with respect to the housing; (3) comprises an operator button; and, (4) has first and second contact surfaces that contact the first and second actuator pins, respectively. The quick fit adjustment mechanism may be adjustable by moving the operator button to move the lever with respect to the housing between: (1) a first position where the first and second actuator pins are in a retracted position with respect to the first and second holes in the housing; and, the second end of the housing is insertable within an opening in a second associated accessory; and, (2) a second position where the first and second actuator pins extend out of the first and second holes and are contactable to an inner surface of the opening in the second associated accessory to secure the second associated accessory to the pole.

According to another embodiment of this invention, a quick fit adjustment mechanism may be used with: (1) an associated pole having a distal end; (2) a first associated paint accessory having an opening with threads formed on its inner surface; and, (3) a second associated paint accessory having an opening with an inner surface. The quick fit adjustment mechanism may comprise: a housing comprising: (1) a first end that is attachable to the distal end of the associated pole; and, (2) a second end having (a) an outer surface with threads that are engageable with the threads on the opening in the first associated paint accessory to secure the first associated paint accessory to the pole; and, (b) first and second holes; first and second actuator pins that are positioned within the first and second holes, respectively; and, a lever that:

(1) is supported to the housing; (2) is moveable with respect to the housing; (3) comprises an operator button; and, (4) has first and second contact surfaces that contact the first and second actuator pins, respectively. The quick fit adjustment mechanism may be adjustable by moving the operator button to move the lever with respect to the housing between: (1) a first position where the first and second actuator pins are in a retracted position with respect to the first and second holes in the housing; and, the second end of the housing is insertable within the opening in the second associated paint accessory; and, (2) a second position where the first and second actuator pins extend out of the first and second holes and contact the inner surface of the opening in the second associated paint accessory to secure the second associated paint accessory to the pole.

According to yet another embodiment of this invention, a method may comprise the steps of: (A) providing a pole having a distal end; (B) providing a quick fit adjustment mechanism comprising: a housing comprising: (1) a first end; and, (2) a second end having (a) an outer surface with threads; and, (h) first and second holes; first and second actuator pins that are positioned within the first and second holes, respectively; and, a lever that: (1) is supported to the housing; (2) is moveable with respect to the housing; (3) comprises an operator button; and, (4) has first and second contact surfaces that contact the first and second actuator pins, respectively; (C) providing the quick fit adjustment mechanism to be adjustable by moving the operator button to move the lever with respect to the housing between: (1) a first position where the first and second actuator pins are in a retracted position with respect to the first and second holes in the housing; and, (2) a second position where the first and second actuator pins extend out of the first and second holes; and, (D) attaching the first end of the housing to the distal end of the pole, Benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 5 is a perspective view of a housing

FIG. 6 is an end view of the first end of the housing.

FIG. 10 is a first side view of the lever.

FIG. 11 is a second side view of the lever.

FIG. 12 is an end view of the lever.

FIG. 13 is a perspective view of an actuator pin.

IV. DETAILED DESCRIPTION

Figure 1:
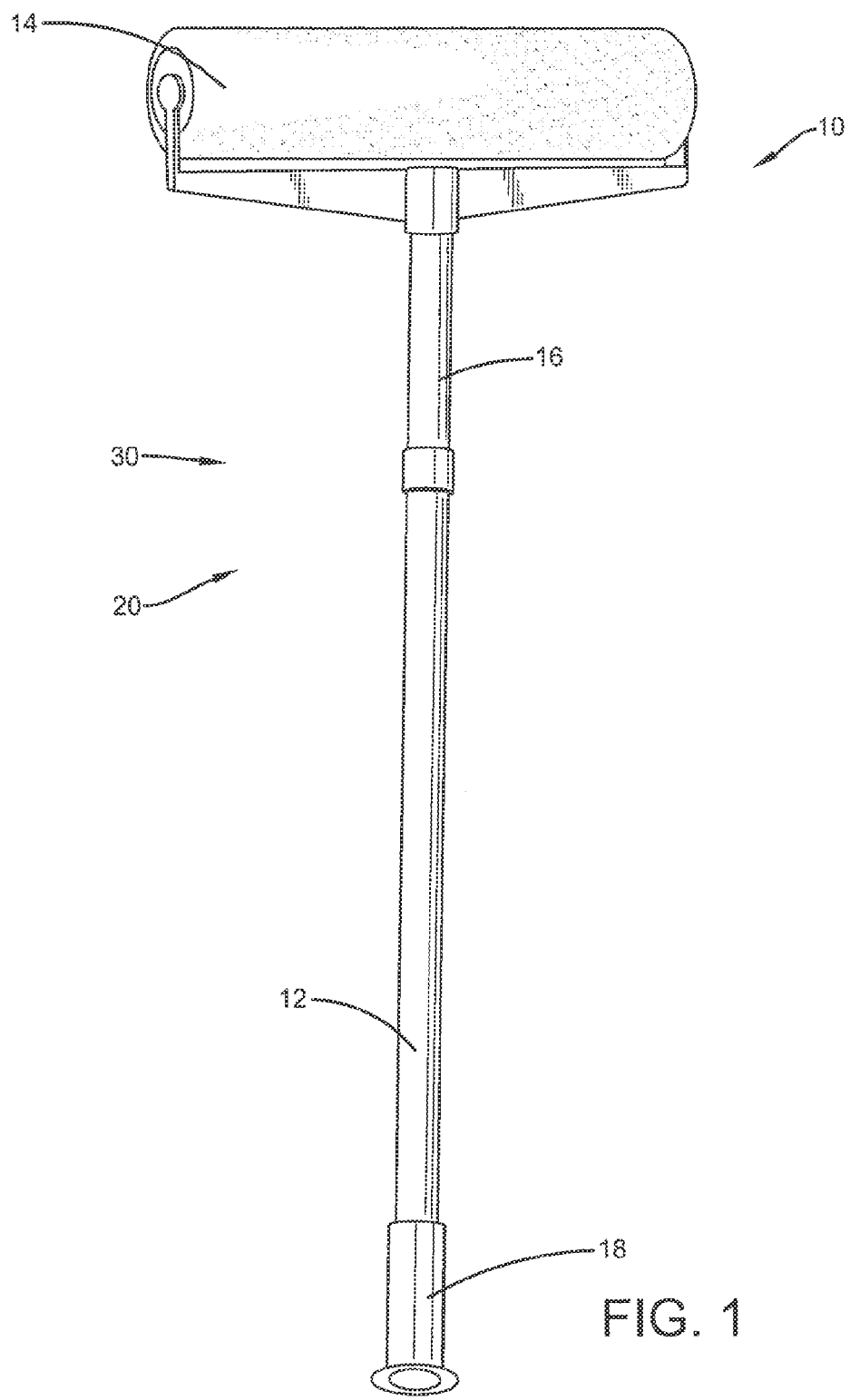
FIG. 1 is a side perspective view of a paint roller assembly that may use a quick fit adjustment mechanism according to some embodiments of this invention.

Referring now to the drawings wherein the showings are for purposes of illustrating embodiments of the invention only and not for purposes of limiting the same, and wherein like reference numerals are understood to refer to like components, FIG. 1 shows an assembly 10 that may use embodiments of a quick fit adjustment mechanism 30 of this invention. The assembly 10 may include a pole 12 that is attached to an accessory 14. The accessory shown is a paint accessory; and more specifically a paint roller. The pole 12 may be used as a handle and thus may include a grip surface 18. The accessory 14 may have a portion 16 to which the pole 12 is connected. In one embodiment, shown, the paint accessory portion 16 is a pole. The quick fit adjustment mechanism 30 may be used to quickly and easily connect the pole 12 to the accessory 14 and to quickly and easily disconnect the pole 12 from the accessory 14. While the quick fit adjustment mechanism 30 is ideally suited for use with paint accessories, including rollers and the like, it is not limited to that application as the quick fit adjustment mechanism 30 may find application to connect and disconnect poles to other accessories and other poles when used with the sound judgment of a person of skill in the art.

The pole 12 may have a distal end 20 and the accessory 14 may have an opening 32. The paint accessory portion 16 may have various designs within the opening 32 and the quick fit adjustment mechanism 30 of this invention is designed to accommodate numerous such designs, making the quick fit adjustment mechanism 30 a nearly universal attachment mechanism.

The quick fit adjustment mechanism 30 may include a housing 50, one or more actuator pins 40, and a lever 36. The housing 50 may have a first end 52 that is attachable to the distal end 20 of the pole 12 and a second end 54 having an outer surface with threads 34. The housing may have holes 56 through which the actuator pins 40 may be extended and retracted. A chamber 58 may be formed in each end of the housing 50 and they may communicate with each other. The chamber 58 in the second end 54 may communicate with the holes 56. The chamber 58 in the first end 52 may have a slot 60 that may extend through the outer surface of the housing 50, as shown. The chamber 58 in the first end 52 may also have at least one channel 62, two shown in FIG. 6, that are formed on a side of the chamber 58. The first end 52 may also have an aperture 66. One or more connection sites 64 which may be used to attach the first end 52 to the pole 12, may be provided.

Figure 16:
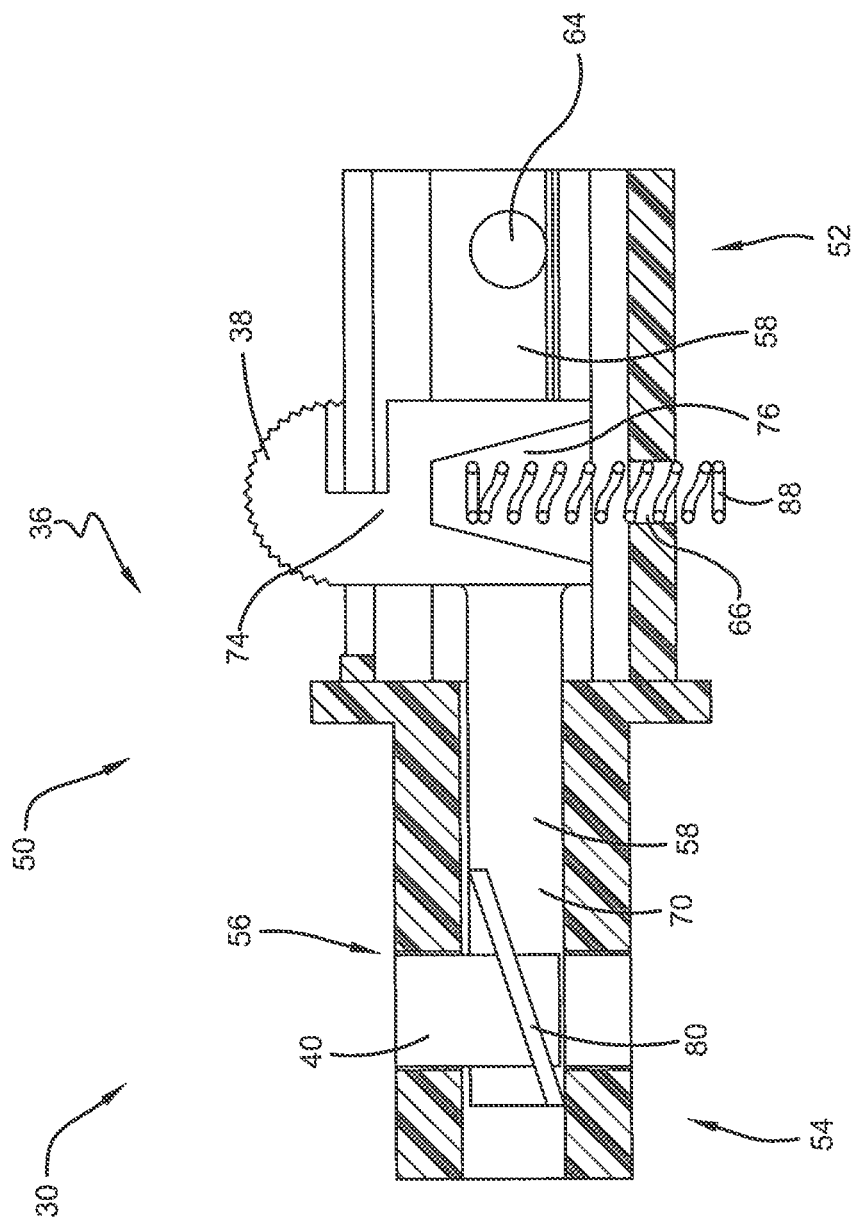
FIG. 16 is a side sectional view of the quick fit adjustment mechanism.

The lever 36 may he supported to the housing 50 and moveable with respect to the housing 50 as will be discussed further below. The lever 36 may have a main body 68 and a plate 70 that extends from the main body 68, as shown. The main body 68 may have at least one rib 72, two shown, that is received in the channel 62 formed in the housing 50 and by which the lever 36 is slidable within and with respect to the housing 50. When the lever 36 is positioned within the housing 50, the plate 70 may extend into the chamber 58 for in the second end 54 of the housing 50. The lever 36 may have a neck 74 that extends from the main body 68 and through the slot 60 in the housing 50. An operator button 38 may be attached to the distal end of the neck 74, as shown. A grip surface 48 may be positioned on the outer surface of the operator button 38 to improve the grip between the user and the operator button 38. The operator button 38 shown is adjustable longitudinally, in the directions indicated by arrow 42. In another embodiment, the button 38 may move laterally, and in yet another embodiment the button may be adjusted by rotational movement. The lever may have an aperture 76, shown in FIG. 16, used as discussed below. The aperture 76 may be cone-shaped, as shown.

The lever 36 may have at least one contact surface 78, two shown, that contacts a corresponding actuator pin 40. In one embodiment, the contact surfaces 78 are on opposite sides of the plate 70. Each contact surface 78 may comprise a ridge 80 that may be angled with respect to a longitudinal center line of the lever when the quick fit adjustment mechanism is attached to the pole. The ridges 80 may be angled in opposite directions, as shown. Each actuator pin 40, see especially FIG. 13, may have a groove 82 that receives the corresponding ridge 80. Each actuator pin 40 may be L-shaped, as shown, having a first leg 84 that may define the distal end, the first to extend out of the hole 56, and a second leg 86 that may have the groove 82. The groove 82 may be angled, as shown, and cooperate with the corresponding ridge 80 to cause the actuator pins 40 to move as will he discussed below.

A biasing device 88 may be used to maintain position of the lever 36 with respect to the housing 50. The biasing device 88 may be a spring that extends through the aperture 66 in the first end of the housing 50 and into the aperture 76 in the lever 36, as shown. In one embodiment, the pole has a cavity into which the first end 52 of the housing 50 is inserted. In this case, the biasing device 88 has a first end that contacts an inner surface of the pole defining the cavity and a second end that is received within the aperture in the lever 36.

In one design, the paint accessory portion 16 may have threads formed on the surface of the opening 32. To accommodate this design, the pins 40 may be retracted, as discussed below. The threads 34 on the housing 50 may then engage the threads on the accessory 14 to secure the accessory 14 to the pole 12. More specifically, the pole 12 may be rotated with respect to the accessory 14 while allowing the threads 34 on pole 12 to engage the threads formed on the surface of the opening 32. The pole 12 can be easily disconnected from the accessory portion 16 by rotating the pole 12 with respect to the paint accessory portion 16 in the opposite direction.

Figure 14:
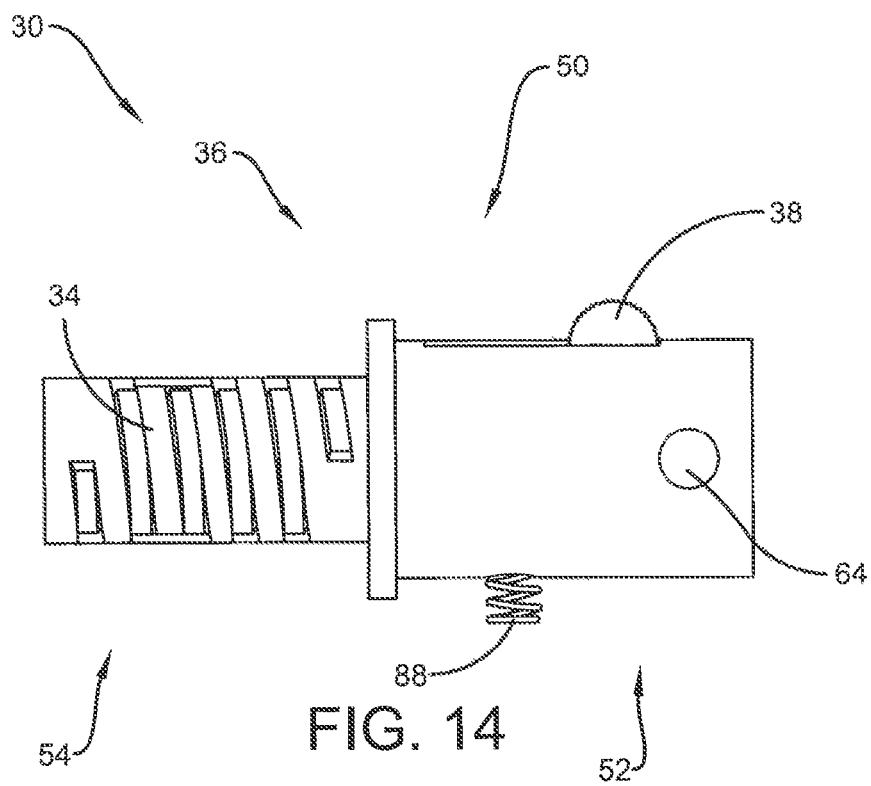
FIG. 14 is a side view of the quick fit adjustment mechanism in a retracted position.
Figure 15:
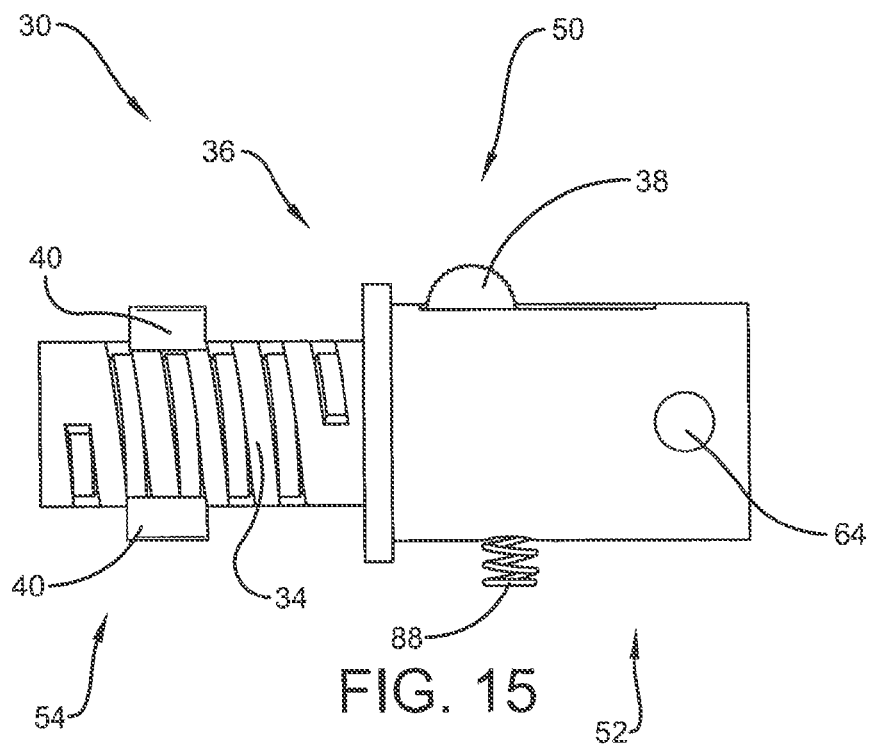
FIG. 15 is a side view of the quick fit adjustment mechanism in an extended position.

In another design, the paint accessory portion 16 is not able to engage the threads 34. In this case, the quick fit adjustment mechanism 30 may be adjusted by moving the operator button 38, see arrow 42, to move the lever 36 with respect to the housing 50 between: (1) a first position, see FIGS. 3 and 14, where the first and second actuator pins are in a retracted position with respect to the first and second holes in the housing; and, the second end of the housing is insertable within an opening in a second associated accessory; and, (2) a second position, see FIGS. 2 and 15, where the first and second actuator pins extend out of the first and second holes and are contactable to an inner surface of the opening in the accessory to secure the accessory to the pole. To then remove the pole 12, it is only necessary to move the operator button, and thus the lever, in the opposite direction. This causes the actuator pins to retract and the pole can then be easily removed.

The actuator pins 40 shown are on opposite sides of the housing, top and bottom surfaces in a specific embodiment, but other positions may work equally well, depending on the shape of the opening 32. The pins 40 may extend from the outer surface of the pole 12 in locations where the threads 34 are not located, as shown. In another embodiment, the pins 40 may extend from the outer surface of the pole 12 in locations where the threads 34 are located. The quick fit adjustment mechanism 30 may include a sleeve 44 that covers a portion of the outer surface of the pole 12, as shown. The sleeve 44 may serve to provide a grip surface for the user and/or may serve to cover/protect the components that engage the operator button 38, hi one embodiment, shown, the button 38 is positioned substantially outside of the sleeve 44.

Figure 2:
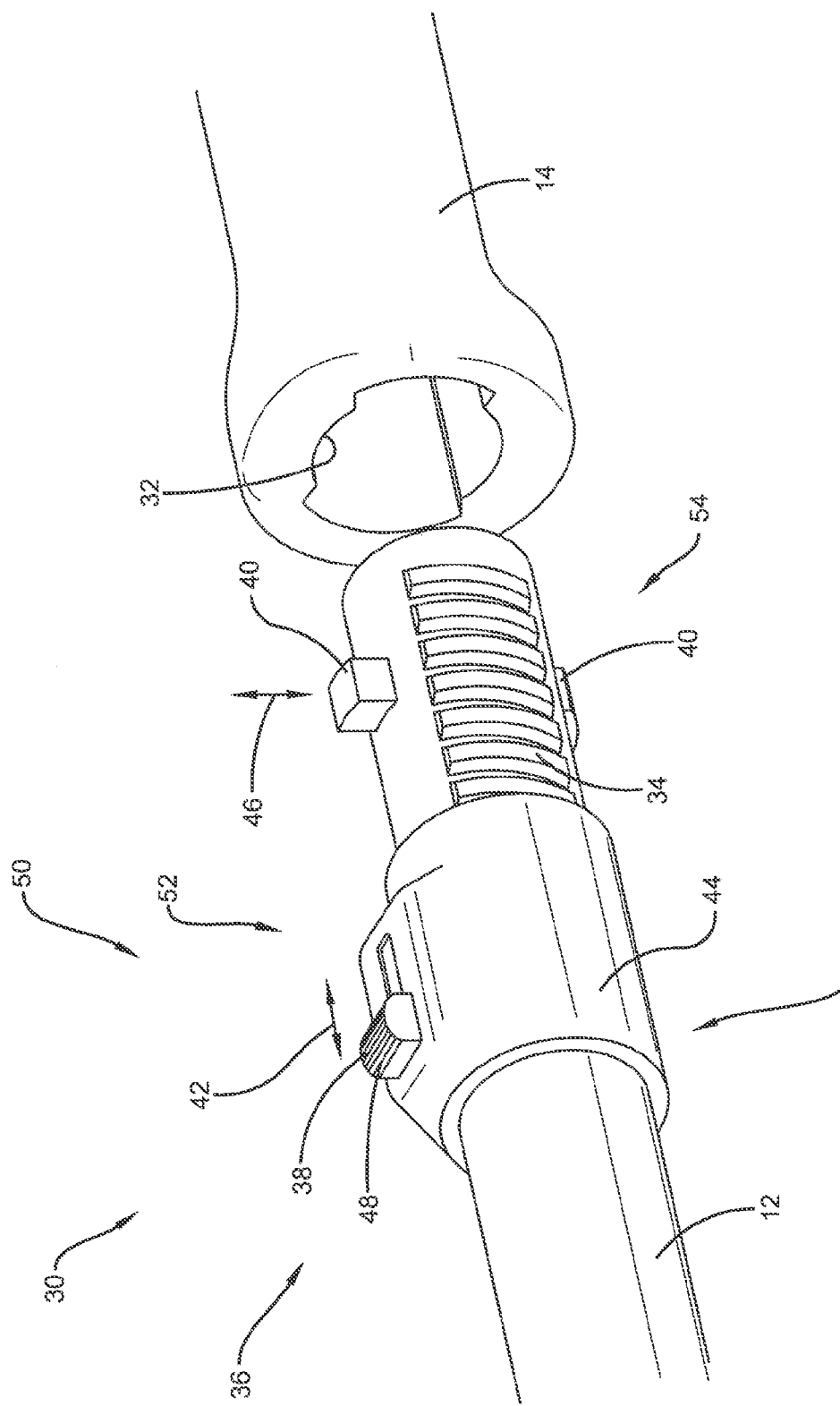
FIG. 2 is a perspective close-up view of a quick fit adjustment mechanism in a first position where actuator pins are extended.
Figure 3:
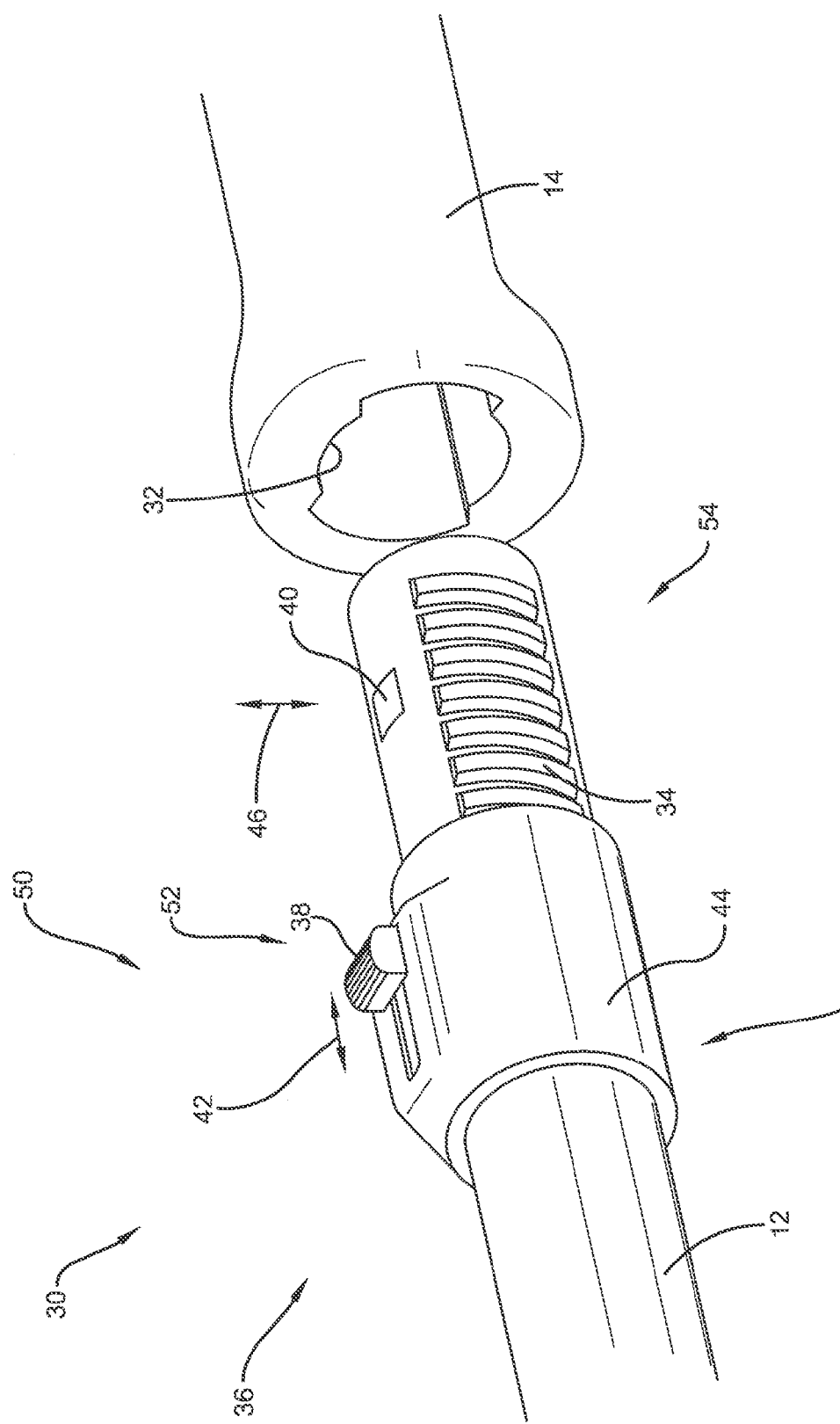
FIG. 3 is a perspective close-up view similar to that shown in FIG. 2 but with the actuator pins retracted.
Figure 4:
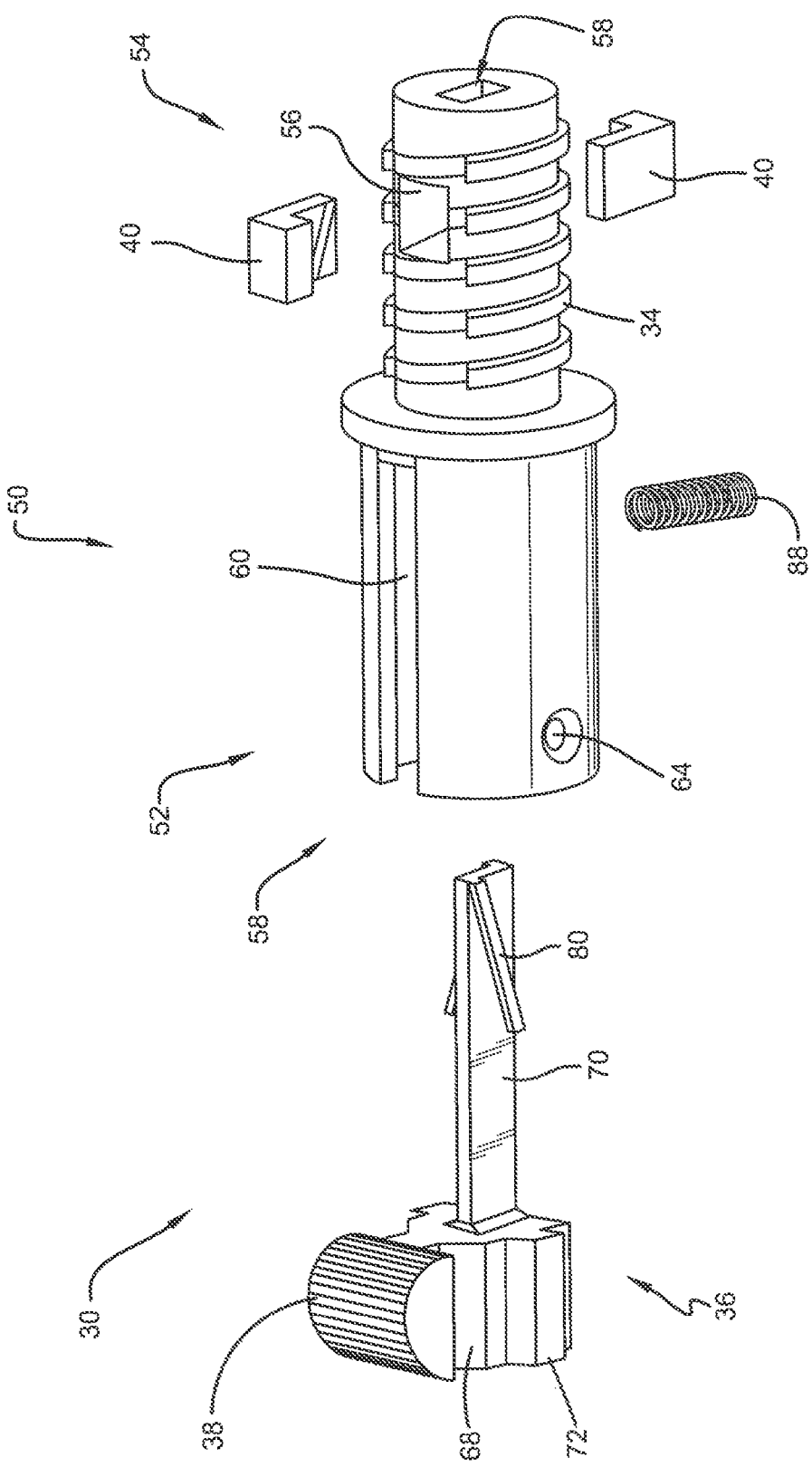
FIG. 4 is an assembly drawing of a quick fit adjustment mechanism.
Figure 7:
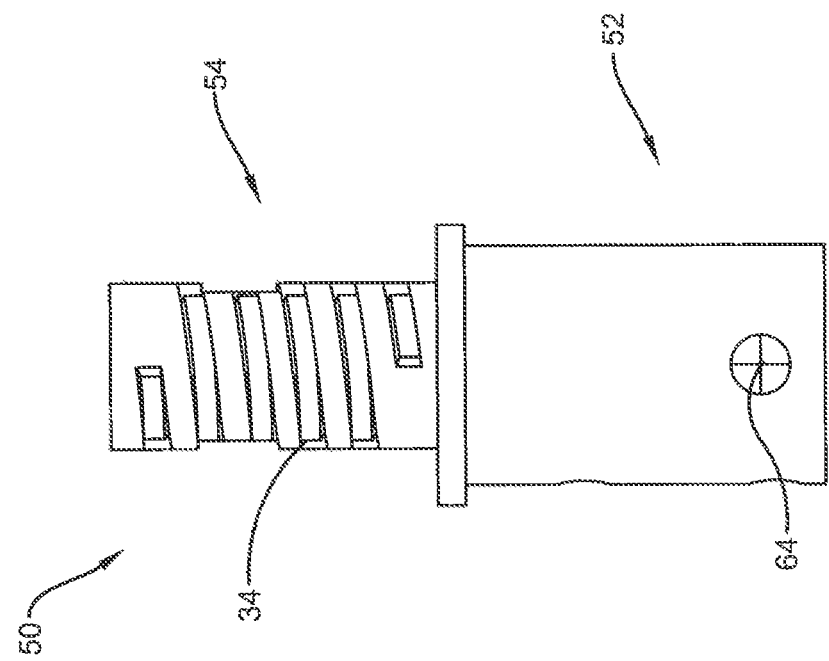
FIG. 7 is a first side view of the housing.
Figure 8:
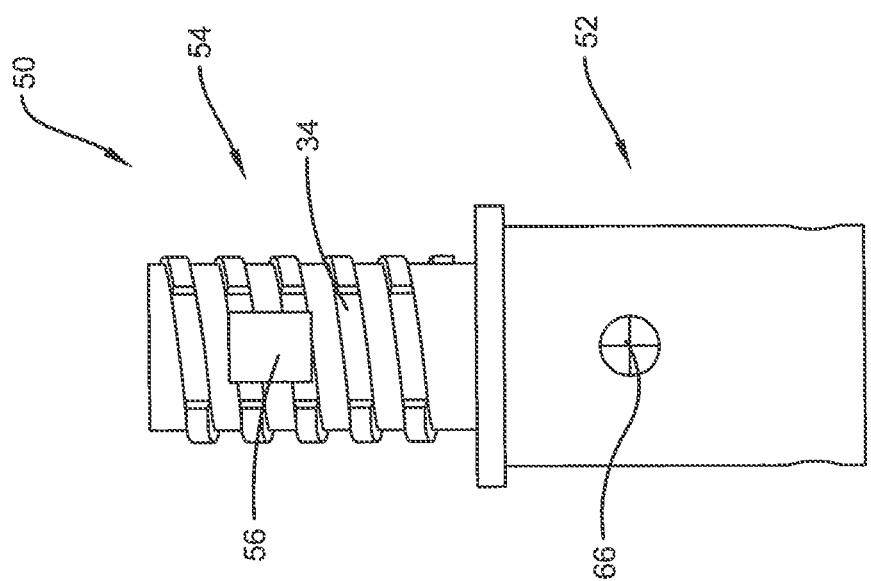
FIG. 8 is a second side view of the housing.
Figure 9:
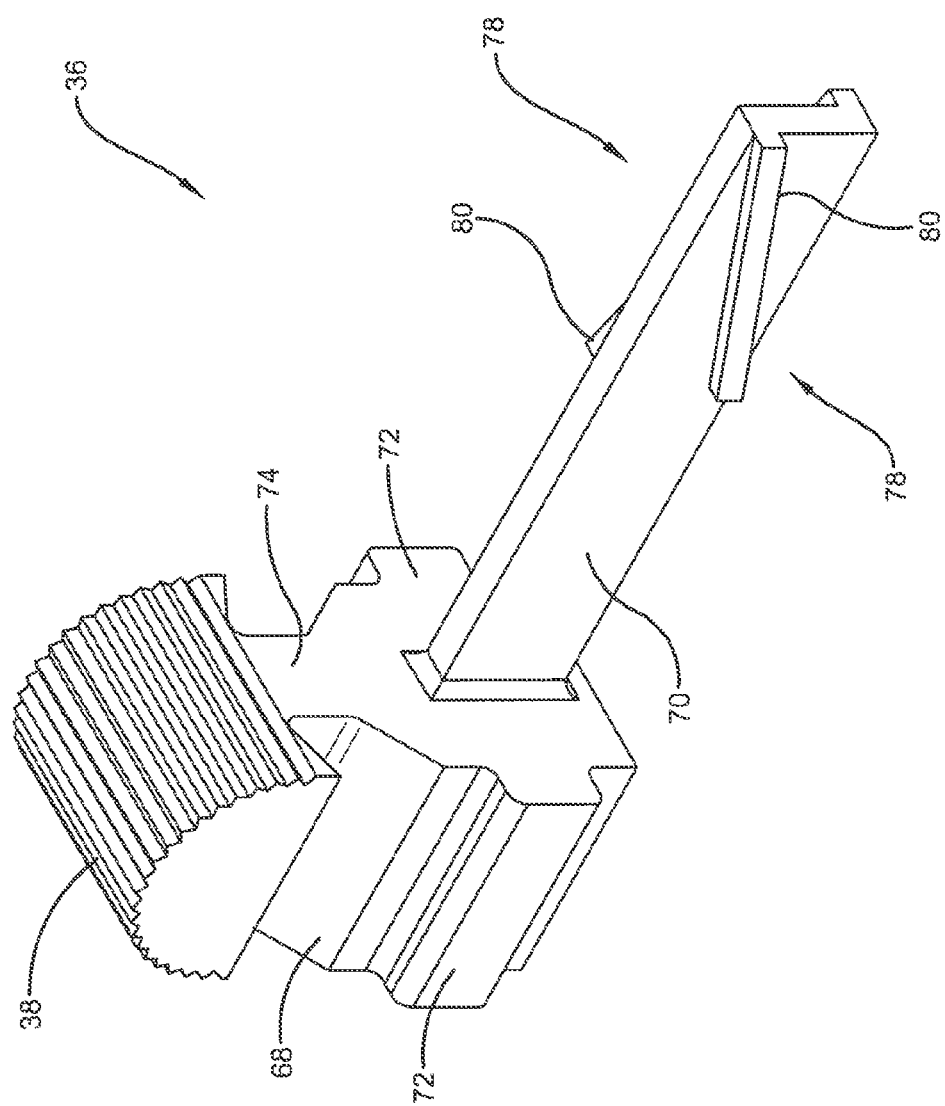
FIG. 9 is a perspective view of a lever.

Within the opening 32, the accessory 14 may have different non-thread designs. In one embodiment, there are apertures sized and positioned to receive the extended actuator pins 40 (as shown in FIG. 2). In another embodiment, there are no such apertures and the actuator pins 40 create enough force to create a frictional connection with the surface that defines the opening 32. Other designs are possible and would work well with this invention. In one embodiment, undesirable wobbling/vibrating is minimized by controlling relative size tolerances. In one specific embodiment, the size tolerances are held to about plus or minus 0.002 inches, The components of the quick fit adjustment mechanism 30 can be made in sizes and of materials chosen with the sound judgment of a person of skill in the art. In one embodiment, the distal end of pole 12 is made with a Zinc die cast body. In another embodiment, the operator button 38 and actuator pins 40 are made from high impact nylon. In yet another embodiment, the sleeve 44 is made of a clear silicone rubber.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

We claim:

1. A quick fit adjustment mechanism comprising:
a housing comprising: (1) a first end that is attachable to an associated pole; and, (2) a second end having (a) an outer surface with threads that are engageable with threads on a first associated accessory to secure the first associated accessory to the associated pole; and, (b) first and second holes;
first and second actuator pins that are positioned within the first and second holes, respectively;
a lever that: (1) is supported to the housing; (2) is moveable with respect to the housing; (3) comprises an operator button; and, (4) has first and second contact surfaces that contact the first and second actuator pins, respectively; and,
wherein the quick fit adjustment mechanism is adjustable by moving the operator button to move the lever with respect to the housing between: (1) a first position where the first and second actuator pins are in a retracted position with respect to the first and second holes in the housing; and, the second end of the housing is insertable within an opening in a second associated accessory; and, (2) a second position where the first and second actuator pins extend out of the first and second holes and are contactable to an inner surface of the opening in the second associated accessory to secure the second associated accessory to the pole.

2. The quick fit adjustment mechanism of claim 1 wherein:
the lever has a longitudinal center line when the quick fit adjustment mechanism is attached to the associated pole;
the first contact surface on the lever comprises a ridge that is angled with respect to the longitudinal center line;
the second contact surface on the lever comprises a ridge that is angled with respect to the longitudinal center line;
the first actuator pin has a groove that receives the ridge formed on the first contact surface; and,
the second actuator pin has a groove that receives the ridge formed on the second contact surface.

3. The quick fit adjustment mechanism of claim 2 wherein:
the first and second contact surfaces on the lever are on opposite sides of the lever; and,
the first and second actuator pins extend out of the first and second holes, respectively, from opposite sides of the second end of the housing.

4. The quick fit adjustment mechanism of claim 3 wherein:
the first end of the housing comprises: a chamber having a slot that extends through the outer surface of the housing; and, a channel formed on a side of the chamber;
the second end of the housing comprises a chamber that communicates with the first and second holes;
the lever comprises: (1) a main body having a rib that is received in the housing channel and is slidable within the housing channel; (2) a plate that extends from the main body into the chamber in the second end of the housing; and, (3) a neck that extends from the main body through the slot formed on the first end of the housing; and,
wherein the operator button is attached to a distal end of the neck.

5. The quick fit adjustment mechanism of claim 4 wherein:
the first end of the housing comprises an aperture;
the lever comprises an aperture; and,
the quick fit adjustment mechanism further comprises a biasing device that extends through the aperture in the first end of the housing and into the aperture in the lever to maintain position of the lever with respect to the housing.

6. The quick fit adjustment mechanism of claim 5 wherein:
the first end of the housing is received within a cavity formed in an end of the associated pole;
the biasing device is a spring having first and second ends;
the first end of the spring contacts an inner surface of the associated pole defining the cavity; and,
the second end of the spring is received within the aperture in the lever.

7. A quick fit adjustment mechanism for use with: (1) an associated pole having a distal end; (2) a first associated paint accessory having an opening with threads formed on its inner surface; and, (3) a second associated paint accessory having an opening with an inner surface; the quick fit adjustment mechanism comprising:
a housing comprising: (1) a first end that is attachable to the distal end of the associated pole; and, (2) a second end having (a) an outer surface with threads that are engageable with the threads on the opening in the first associated paint accessory to secure the first associated paint accessory to the pole; and, (b) first and second holes;
first and second actuator pins that are positioned within the first and second holes, respectively;
a lever that: (1) is supported to the housing; (2) is moveable with respect to the housing; (3) comprises an operator button; and, (4) has first and second contact surfaces that contact the first and second actuator pins, respectively; and, wherein the quick fit adjustment mechanism is adjustable by moving the operator button to move the lever with respect to the housing between: (1) a first position where the first and second actuator pins are in a retracted position with respect to the first and second holes in the housing; and, the second end of the housing is insertable within the opening in the second associated paint accessory; and, (2) a second position where the first and second actuator pins extend out of the first and second holes and contact the inner surface of the opening in the second associated paint accessory to secure the second associated paint accessory to the pole.

8. The quick fit adjustment mechanism of claim 7 further comprising:
a sleeve that covers an outer surface of the distal end of the associated pole; and,
wherein the operator button extends outside of the sleeve.

9. The quick fit adjustment mechanism of claim 7 wherein:
the lever has a longitudinal center line when the quick fit adjustment mechanism is attached to the distal end of the associated pole;
the first contact surface on the lever comprises a ridge that is angled with respect to the longitudinal center line;
the second contact surface on the lever comprises a ridge that is angled with respect to the longitudinal center line;
the first actuator pin has a groove that receives the ridge formed on the first contact surface; and,
the second actuator pin has a groove that receives the ridge formed on the second contact surface.

10. The quick fit adjustment mechanism of claim 7 wherein:
the first and second contact surfaces on the lever are on opposite sides of the lever; and,
the first and second actuator pins extend out of the first and second holes, respectively, from opposite sides of the second end of the housing.

11. The quick fit adjustment mechanism of claim 7 wherein:
the first end of the housing comprises: a chamber having a slot that extends through the outer surface of the housing; and, a channel formed on a side of the chamber;
the second end of the housing comprises a chamber that communicates with the first and second holes;
the lever comprises: (1) a main body having a rib that is received in the housing channel and is slidable within the housing channel; (2) a plate that extends from the main body into the chamber in the second end of the housing; and, (3) a neck that extends from the main body through the slot formed on the first end of the housing; and,
wherein the operator button is attached to a distal end of the neck.

12. The quick fit adjustment mechanism of claim 7 wherein:
the first end of the housing comprises an aperture;
the lever comprises an aperture; and,
the quick fit adjustment mechanism further comprises a biasing device that extends through the aperture in the first end of the housing and into the aperture in the lever to maintain position of the lever with respect to the housing.

13. The quick fit adjustment mechanism of claim 12 wherein:
the first end of the housing is received within a cavity formed in the distal end of the associated pole;
the biasing device is a spring having first and second ends;
the first end of the spring contacts an inner surface of the associated pole defining the cavity; and,
the second end of the spring is received within the aperture in the lever.

14. The quick fit adjustment mechanism of claim 7 wherein:
the first and second holes are formed on the second end of the housing at locations where the threads formed on the outer surface of distal end of the pole are not located.

15. A method comprising the steps of:
(A) providing a pole having a distal end;
(B) providing a quick fit adjustment mechanism comprising: a housing comprising: (1) a first end; and, (2) a second end having (a) an outer surface with threads; and, (b) first and second holes; first and second actuator pins that are positioned within the first and second holes, respectively; and, a lever that: (1) is supported to the housing; (2) is moveable with respect to the housing; (3) comprises an operator button; and, (4) has first and second contact surfaces that contact the first and second actuator pins, respectively;
(C) providing the quick fit adjustment mechanism to be adjustable by moving the operator button to move the lever with respect to the housing between: (1) a first position where the first and second actuator pins are in a retracted position with respect to the first and second holes in the housing; and, (2) a second position where the first and second actuator pins extend out of the first and second holes; and,
(D) attaching the first end of the housing to the distal end of the pole.

16. The method of claim 15 further comprising the steps of:
providing an accessory having accessory threads; and,
engaging the threads on the outer surface of the second end of the housing to the accessory threads to secure the accessory to the pole.

17. The method of claim 16 further comprising the steps of:
providing the accessory to he a paint accessory comprising a pole with an opening having the accessory threads.

18. The method of claim 15 further comprising the steps of:
providing an accessory having an opening;
adjusting the quick fit adjustment mechanism into the first position;
inserting the second end of the housing within the opening in the accessory; and,
adjusting the quick fit adjustment mechanism into the second position so that the first and second actuator pins contact an inner surface of the opening in the accessory to secure the accessory to the pole.

19. The method of claim 18 further comprising the step of:
providing the accessory to be a paint accessory.

20. The method of claim 18 further comprising the steps of:
adjusting the quick fit adjustment mechanism into the first position; and
removing the second end of the housing from the opening in the accessory.

* * * * *

UNITED STATES PATENT AND TRADEMARK OFFICE
CERTIFICATE OF CORRECTION

| | | |
|---|---|---|
| PATENT NO. | : 9,127,699 B2 | Page 1 of 1 |
| APPLICATION NO. | : 13/840852 | |
| DATED | : September 8, 2015 | |
| INVENTOR(S) | : Lambertson, Jr. et al. | |

It is certified that error appears in the above-identified patent and that said Letters Patent is hereby corrected as shown below:

In the Specification

Column 1, Line 19, delete "It is also know,", and insert --It is also known,--.

Column 2, Line 28, delete "(h)", and insert --(b)--.

Column 5, Line 13, delete "hi", and insert --In--.

Column 5, Line 25, delete "inches,", and insert --inches.--.

In the Claims

Column 8, Line 43, delete "he", and insert --be--.

Signed and Sealed this
Twenty-sixth Day of April, 2016

Michelle K. Lee
*Director of the United States Patent and Trademark Office*